H. W. GOODALL.
HOSE.
APPLICATION FILED DEC. 31, 1913.

1,281,557.

Patented Oct. 15, 1918.

WITNESSES:

INVENTOR
Howard W. Goodall
BY
Augustus B. Stoughton.
ATTORNEY.

UNITED STATES PATENT OFFICE.

HOWARD W. GOODALL, OF ALDEN, PENNSYLVANIA.

HOSE.

1,281,557. Specification of Letters Patent. Patented Oct. 15, 1918.

Application filed December 31, 1913. Serial No. 809,715.

*To all whom it may concern:*

Be it known that I, HOWARD W. GOODALL, a citizen of the United States, residing at Alden, in the county of Delaware and State of Pennsylvania, have invented certain new and useful Improvements in Hose, of which the following is a specification.

In the manufacture of suction and some other kinds of hose it is customary to insert between the outer and inner plies a metal reinforcement and a layer of rubber material. The latter does not adhere to the metal which is loose so that the outer and inner plies are only joined together between the metal reinforcements or, more accurately, between the spiral windings of the metal reinforcements, so that in use either under pressure or suction the outer and inner plies, being joined only at intervals and not where the reinforcement occurs, separate from each other.

The principal object of the present invention is to avoid this defect and disadvantage and to join the outer and inner plies throughout the entire length thereof and thus increase the efficiency and durability of the hose.

To this and other ends hereinafter set forth the invention comprises the combination with the hose of a textile or fabric envelop surrounding and following the individual turns of the spiral metal reinforcement and serving with the layer of rubber material to join the outer and inner plies throughout their entire length and to hold the individual turns of the reinforcement in place, and the invention further comprises the improvements claimed at the end hereof and described in connection with the accompanying drawings in which—

Figure 1:
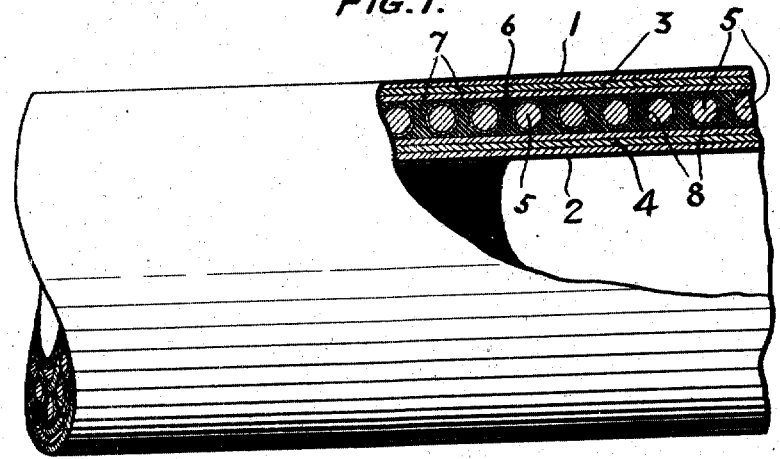
Figure 2:
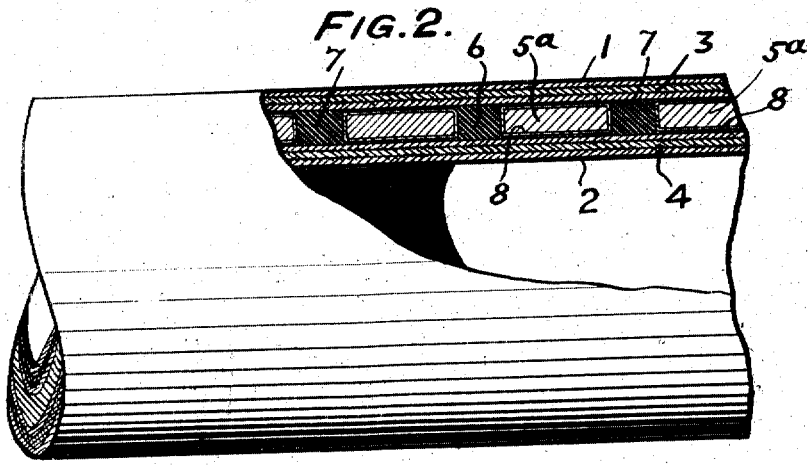

Figure 1, is a side view, partly in section, of a hose embodying features of the invention, and Fig. 2, is a similar view illustrating a modification.

In the drawings 1 and 2, are the outer and inner rubber layers or layers of rubber material that are usually applied to the outside and inside of the hose. 3 and 4, are the outer and inner textile layers as of duck and rubber or rubber material. Between these inner and outer textile layers there is a metal reinforcement which is wound spirally. This reinforcement may have an appropriate cross-section. As shown in Fig. 1, the reinforcement 5, is of circular cross-section, and as shown in Fig. 2, the reinforcement $5^a$, is of rectangular cross-section. 6, is a layer of rubber or rubber material arranged between the inner and outer textile layers and in which the reinforcement is embedded. At the points or intervals 7, between the reinforcements or the windings of the reinforcement, the material 6, firmly joins the textile layers as by vulcanization. 8, is a textile envelop surrounding the metal reinforcement and it may consist of a cover of thread wound, braided or otherwise applied, and by thread it is intended to include material to which the rubber layer 6, will adhere as by vulcanization. This envelop 8, joins the outer and inner textile layers and thus the latter are connected throughout their length, and while the rubber does not vulcanize to the metal of the reinforcement, it does adhere to the covering or envelop. By the described construction, although the reinforcement is not vulcanized to its cover, still it is held in place thereby and the cover is vulcanized and joined to the inner and outer textile layer, so that it serves to connect them.

It will be obvious to those skilled in the art to which the invention relates that modifications may be made in details of construction and arrangement, for example, in the number of plies making up the textile layers and in other matters of the same general kind, without departing from the spirit of the invention, hence the latter is not limited by words or language used herein, nor in any way further than the state of the art may require.

What I claim is:

A hose comprising the combination of inner and outer textile layers having a layer of rubber between them, a metal reinforcement arranged spirally between the layers, and a textile envelop surrounding and inclosing the reinforcement and following its individual spiral turns, said rubber vulcanized to all said textile material thereby serving to connect the inner and outer layers at all points and said textile envelop serving to hold the individual spirals of the reinforcement in place.

HOWARD W. GOODALL.

Witnesses:
CLIFFORD K. CASSEL,
FRANK E. FRENCH.